US012735996B2

(12) United States Patent
Bougelet et al.

(10) Patent No.: US 12,735,996 B2
(45) Date of Patent: Sep. 15, 2026

(54) OIL TANK FOR A TURBOMACHINE WITH A LOWER COMPARTMENT HAVING AN OIL OUTLET DUCT THAT IS NEGATIVE-G-COMPATIBLE

(71) Applicants: SAFRAN AERO BOOSTERS, Herstal (BE); SAFRAN AIRCRAFT ENGINES, Paris (FR)

(72) Inventors: Stéphane Alain Luc Ghislain Bougelet, Herstal (BE); Sébastien Oriol, Paris (FR)

(73) Assignees: SAFRAN AERO BOOSTERS, Herstal (BE); SAFRAN AIRCRAFT ENGINES, Paris (FR)

( * ) Notice: Subject to any disclaimer, the term of this patent is extended or adjusted under 35 U.S.C. 154(b) by 134 days.

(21) Appl. No.: 18/876,846

(22) PCT Filed: Jun. 21, 2023

(86) PCT No.: PCT/FR2023/000119
§ 371 (c)(1),
(2) Date: Dec. 19, 2024

(87) PCT Pub. No.: WO2023/247846
PCT Pub. Date: Dec. 28, 2023

(65) Prior Publication Data

US 2026/0243173 A1 Aug. 20, 2026

(30) Foreign Application Priority Data

Jun. 24, 2022 (EP) .................................... 22315125

(51) Int. Cl.
*F01D 17/16* (2006.01)
*F01D 25/18* (2006.01)
(Continued)

(52) U.S. Cl.
CPC ............. *F01D 25/18* (2013.01); *F01D 17/16* (2013.01); *F01M 11/0004* (2013.01);
(Continued)

(58) Field of Classification Search
CPC ..... F01D 25/18; F01D 17/16; F01M 11/0004; F01M 2011/0041; F01M 2011/0037;
(Continued)

(56) References Cited

U.S. PATENT DOCUMENTS 3,889,705 A * 6/1975 Coderre ................. F16L 55/04 137/577
4,210,176 A * 7/1980 Emming .................. F15B 1/26 137/574
(Continued)

FOREIGN PATENT DOCUMENTS

EP 1104742 A1 6/2001
EP 2166196 A2 3/2010
(Continued)

OTHER PUBLICATIONS

International Search Report for PCT/FR2023/000119, dated Jun. 21, 2023, 2 pages.

*Primary Examiner* — Nathaniel E Wiehe
*Assistant Examiner* — Theodore C Ribadeneyra
(74) *Attorney, Agent, or Firm* — RANKIN, HILL & CLARK LLP

(57) ABSTRACT

An oil tank for a turbomachine, including an enclosure for the oil, having a main axis, and with walls delimiting a first compartment and a second compartment separated from the first compartment by a separation wall; a channel extending into the first compartment, from the separation wall; an oil inlet mixed with air, arranged on the second compartment; an oil outlet including a conduit extending and opening into the first compartment. The channel extends inside the con-
(Continued)

duit, so as to ensure oil filling of the conduit and thus maintain an oil supply to the conduit during flight phases in zero or negative gravity.

15 Claims, 4 Drawing Sheets

(51) Int. Cl.
*F01M 11/00* (2006.01)
*F01M 11/06* (2006.01)
*F16H 57/04* (2010.01)

(52) U.S. Cl.
CPC ....... *F01M 11/067* (2013.01); *F16H 57/0442* (2013.01); *F16H 57/0443* (2013.01); *F16H 57/045* (2013.01); *F01M 2011/0037* (2013.01); *F01M 2011/0041* (2013.01); *F05D 2260/98* (2013.01)

(58) Field of Classification Search
CPC ............... F01M 11/067; F05D 2260/98; F16H 57/0442; F16H 57/0443; F16H 57/045
See application file for complete search history.

(56) References Cited

U.S. PATENT DOCUMENTS 4,424,829 A * 1/1984 Millington ................ F15B 1/26 137/574
4,604,196 A * 8/1986 Lowrie ............. B01D 17/0208 210/522
6,758,886 B2 * 7/2004 Vellinga ................ C02F 3/2846 210/801
8,739,822 B2 * 6/2014 Uenishi ................ F15B 21/044 137/574
2004/0016601 A1 * 1/2004 Brouillet ................ F01D 25/18 184/103.1

FOREIGN PATENT DOCUMENTS

EP 2801707 A1 11/2014
FR 3010133 A1 3/2015
FR 3024497 A1 2/2016
FR 3107319 A1 8/2021

* cited by examiner

[Fig 1]
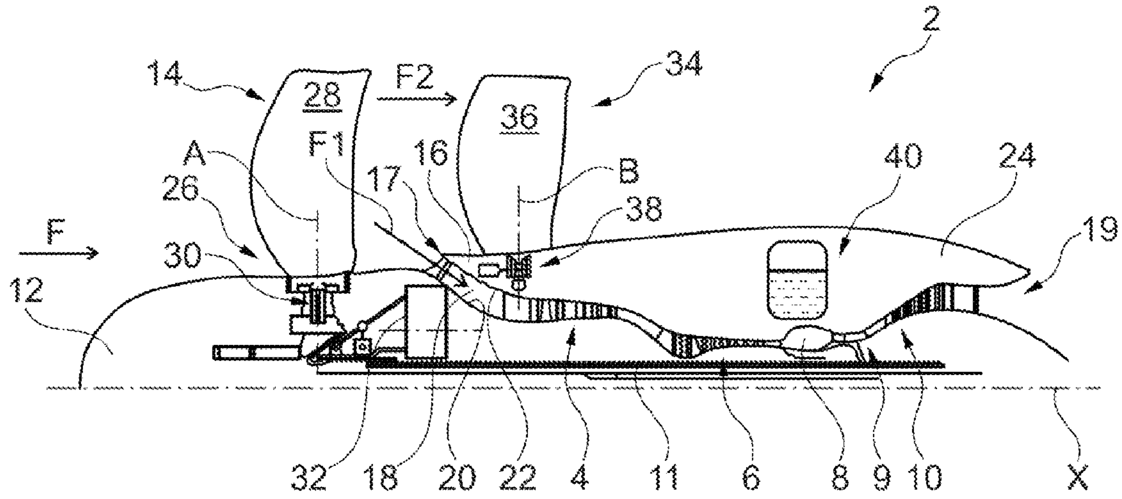
[Fig 2]
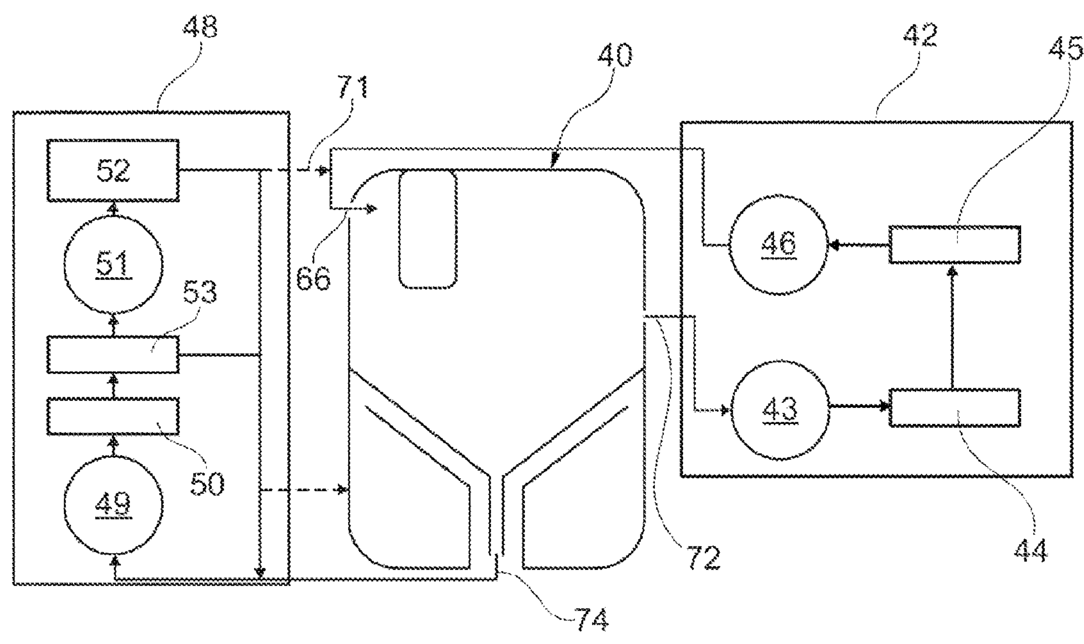

[Fig 3]
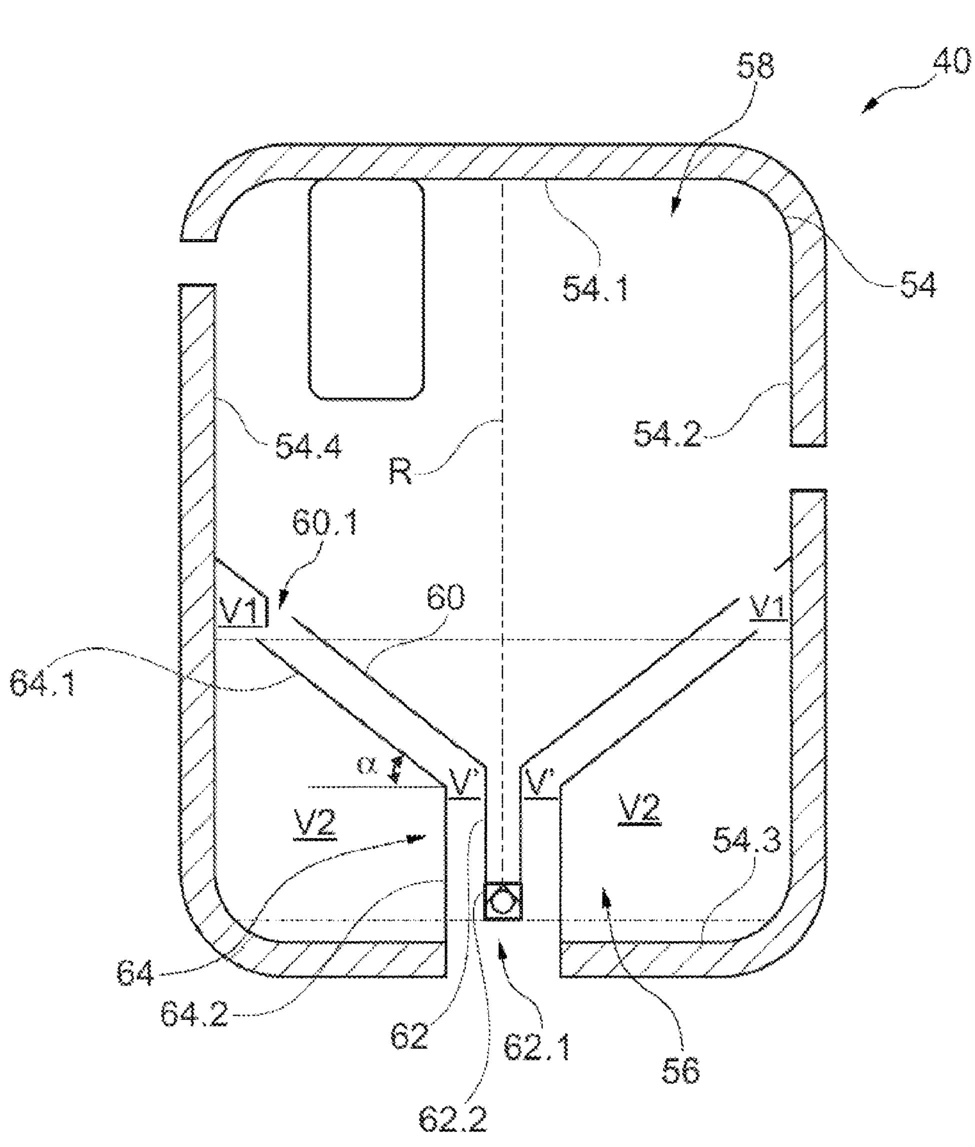

[Fig 4]
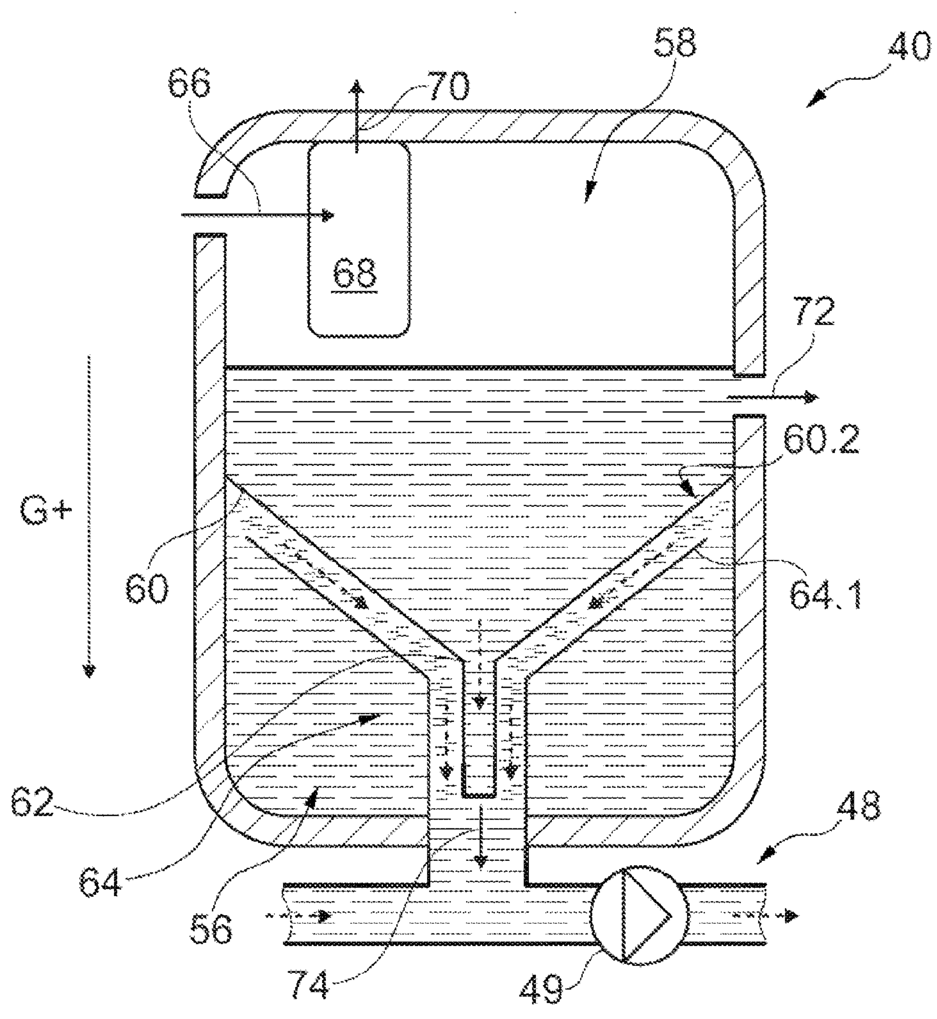

[Fig 5]
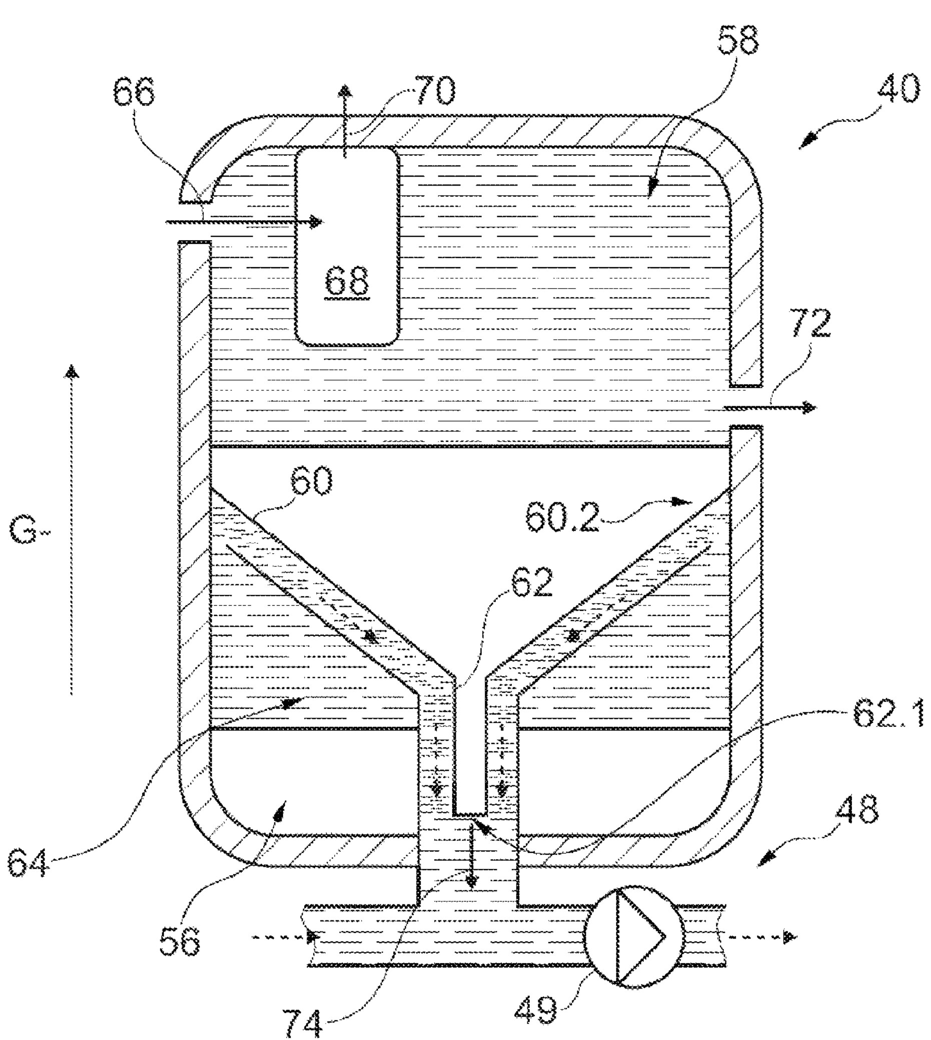

OIL TANK FOR A TURBOMACHINE WITH A LOWER COMPARTMENT HAVING AN OIL OUTLET DUCT THAT IS NEGATIVE-G-COMPATIBLE

DOMAIN

The invention relates to the field of turbomachine tanks. More specifically, the invention relates to the field of oil tanks used to lubricate turbomachine components, in particular comprising an unducted variable-pitch propeller. and/or a variable pitch rectifier.

PRIOR ART

Aircraft turbomachines comprising at least one unducted propeller are known by the English term "open rotor" or "unducted fan". In this category of turbomachine, there are those which have two unducted and counter-rotating propellers (known by the English acronym UDF for "Unducted Dual Fan") or those having a single unducted propeller and a rectifier comprising several stator blades (known by the English acronym USF for Unducted Single Fan).

These turbomachines are turboprops which are distinguished from turbojets by the use of a propeller outside the nacelle (unducted) instead of an internal fan.

The propeller or propellers forming the propulsion part generally comprise a system for actuating the pitch of the blades of the propeller(s), also referred to as a variable pitch system. Such a system allows the blades of the propeller to be oriented according to the needs of the flight phases of the aircraft (takeoff, cruise, landing, etc.) in order to ensure thrust management in all flight cases of the turbomachine.

In the case of turbomachines with a single unducted propeller and a rectifier, the latter may also comprise a variable-pitch system so as to improve the performance of the turbomachine. An example of such a turbomachine is disclosed by published patent document FR 3 107 319 A1.

Variable pitch systems may require a permanent oil supply to enable the blade pitch to be actuated and the engine thrust to be managed in all flight conditions of the turbomachine (nominal and extreme). In the state of the art, these systems are supplied by a main lubrication circuit to ensure an oil supply to the various components of the engine (bearings, reducer, etc.) to provide lubrication and/or cooling functions. This circuit is supplied with oil by a main tank of the turbomachine comprising, among other things, an oil inlet in the upper part and an outlet in the lower part, in a vertical mounting direction, which allows an oil supply during flight attitudes under gravity or positive load factor (positive G).

While such tanks are entirely satisfactory when the aircraft is flying in positive G flight situations, on the other hand, when it comes to flight phases under zero or negative load factor (zero G or negative G), i.e., when the aircraft is manoeuvring or in the event of an upward gust of wind, these tanks no longer completely ensure the oil supply to the pitch actuation system.

Indeed, zero-G or negative-G flight phases are temporary flight phases (generally lasting less than 30 seconds for civil aircraft) for which the aircraft is subjected to negative accelerations, for example, when it undergoes sudden changes in altitude.

To this end, the oil contained in the main tank is then spilled, the oil is no longer located near the outlet in the lower part, which generates a cut in the oil supply, causing air to pass towards the variable pitch circuit(s), thus causing harmful consequences on the operation of the turbomachine which may lead to a loss of control of the aircraft.

It is possible to use tanks such as those used in fighter aircraft, where negative G flight phases are frequent and essential. However, these tanks are pressurized, which implies a significant excess weight, as well as a high additional cost, incompatible with turbomachines comprising at least one unducted propeller.

Furthermore, a known solution to avoid harming the propeller pitch actuation circuit is, in the case of negative G, to ensure the oil supply by means of a system other than the main oil tank of the turbomachine. However, such a solution involves significant bulk and mass within the turbomachine and complex management of the routing of the oil to the variable pitch system.

The published patent document FR 3 010 133 A1 discloses a tank comprising an inclined partition provided at its ends with through holes for continuous supply of the turbomachine. However, the solution proposed by the document has room for improvement in order to allow, for example, a greater volume of oil available to supply the components of the turbomachine in the event of negative G flight, and without hindering said volume when returning to positive G.

SUMMARY OF THE INVENTION

Technical Problem

The present invention aims to overcome at least one of the drawbacks of the aforementioned state of the art. More particularly, the invention aims to propose an oil tank whose design is such that it allows the aircraft to carry out, in complete safety, temporary phases of flight in negative gravity, without increasing the weight and cost of the tanks.

Technical Solution

The invention relates to an oil tank for a turbomachine, comprising:

- an enclosure for the oil, having a main axis, and with walls delimiting a first compartment and a second compartment separated from the first compartment by a separation wall;
- a channel extending into the first compartment, from the separation wall;
- an oil inlet for oil mixed with air, arranged on the second compartment;
- an oil outlet comprising a conduit extending and opening into the first compartment; wherein the channel extends inside the conduit, so as to ensure oil supply to the conduit and thus maintain an oil supply to the conduit during flight phases in zero or negative gravity.

According to an advantageous embodiment of the invention, the separation wall is inclined relative to a perpendicular to the main axis, towards the channel so as to guide the oil towards said channel.

According to an advantageous embodiment of the invention, the dividing wall has with the perpendicular to the main axis an angle of inclination (a) of between 10° and 60°, more preferably of between 30° and 50°.

According to an advantageous embodiment of the invention, the conduit comprises a distal portion parallel to the separation wall or inclined relative to said separation wall by less than 20°.

According to an advantageous embodiment of the invention, the channel is in the central position of the separation wall and said separation wall is funnel-shaped.

According to an advantageous embodiment of the invention, the distal part of the conduit is funnel-shaped corresponding to the funnel shape of the separation wall.

According to an advantageous embodiment of the invention, the conduit comprises a proximal part substantially parallel to the main axis.

According to an advantageous embodiment of the invention, the distal part of the conduit presents at least 40% of a total extent of said conduit.

According to an advantageous embodiment of the invention, the conduit has a section corresponding to at least 1.2 times a section of the channel.

According to an advantageous embodiment of the invention, the channel comprises a distal end forming with the distal part of the conduit a buffer volume inside said conduit, said distal end of the channel and the distal part of the conduit form a second volume outside the conduit, and the distal part of the conduit forms with the separation wall a first volume, said first volume being smaller than the second volume in the first compartment.

According to an advantageous embodiment of the invention, the separation wall and/or the distal end of the channel further comprises at least one valve and/or at least one non-return valve sensitive to changes in gravity.

The invention also relates to a turbomachine comprising:

- an unducted propeller propelling an incoming air flow, said propeller comprising a variable pitch system for actuating the pitch of the blades of the propeller;
- an oil tank for lubricating components of the turbomachine; wherein in that said tank comprises:—an enclosure for the oil, having a main axis, and with walls delimiting a first compartment and a second compartment separated from the first compartment by a separation wall;
- a channel extending into the first compartment, from the separation wall;
- an inlet for oil mixed with air, arranged on the second compartment;
- an oil outlet comprising a conduit extending and opening into the first compartment; the channel extends inside the conduit, so as to ensure oil feeding of the conduit and thus maintain an oil supply to the conduit during flight phases of the turbomachine in zero or negative gravity.

According to an advantageous embodiment of the invention, the oil inlet to the second compartment and an upper oil outlet form with the second compartment a first closed circuit intended for the lubrication and/or cooling of the components of the turbomachine engine.

According to an advantageous embodiment of the invention, the variable pitch system is a first variable pitch system, and said turbomachine further comprises a rectifier comprising a plurality of stator blades extending from a fixed casing, said rectifier comprising a second variable pitch system, and in that the oil outlet is hydraulically connected to a second closed circuit comprising components of the first system and/or of the second variable pitch system of the turbomachine.

According to an advantageous embodiment of the invention, the oil tank of the turbomachine is according to one of the aforementioned advantageous embodiments of the invention.

Advantages of the Invention

The invention is particularly advantageous in that it makes it possible to guarantee an oil supply to the various components of the turbomachine, including in particular the variable-pitch system(s), while ensuring that the latter is/are supplied with pure oil without any presence of air and without interruption of supply during the flight phases in zero gravity and in negative gravity. Thus, the hydraulic control of the propeller pitch actuation system of the turbomachine can remain operational during all flight phases of the aircraft.

Advantageously, the simplicity of the architecture of the oil tank of the present invention allows it to ensure reliable operation. In addition, the tank is compact, which makes it possible to reduce the overall size and mass of the turbomachine.

DESCRIPTION OF THE DRAWINGS

FIG. 1 is a schematic axial sectional view of an aircraft turbomachine according to the invention;

FIG. 2 is a diagram of the various closed circuits connected to the oil tank of the invention;

FIG. 3 represents a sectional view of the oil tank according to the invention;

FIG. 4 represents a sectional view of the oil tank of FIG. 3 during a phase of flight of the aircraft in positive gravity;

FIG. 5 shows a sectional view of the oil tank of FIG. 3 during a phase of flight of the aircraft in negative gravity.

DETAILED DESCRIPTION

The figures show the elements schematically and are not drawn to scale. In particular, some dimensions are enlarged to facilitate reading of the figures.

FIG. 1 schematically illustrates an axial sectional view of an aircraft turbomachine according to the invention. This is a turbomachine known by the English expression "open rotor" or "unducted fan", and particularly a USF "Unducted Single Fan" turbomachine.

In the following description, the terms "internal" and "external" refer to a positioning relative to the axis of rotation of a turbomachine, and here along the longitudinal axis X (and even from left to right in FIG. 1). The terms "radial", "internal" and "external" are defined relative to a radial direction perpendicular to the longitudinal axis X. Upstream and downstream refer to the direction of flow of a flow in the turbomachine. Furthermore, the elements illustrated in the figures which are identical or substantially identical and/or with the same functions are represented by the same numerical references.

The turbomachine 2 typically comprises, from upstream to downstream, a first compression level, called low pressure compressor 4, as well as a second compression level, called high pressure compressor 6, a combustion chamber 8 followed by a high-pressure turbine 9 and a low-pressure turbine 10.

The turbomachine 2 comprises a propeller 14 arranged upstream of a separation nozzle 16 carried by an external casing 24 and capable of separating the air flow F into a secondary flow F2 and a primary flow F1 circulating in a primary vein 18 and crossing the various aforementioned levels of the turbomachine 2.

The primary vein 18 is delimited radially by a radially internal wall 20 and a radially external wall 22. The radially internal wall 20 is carried by the internal casing 12. The radially external wall 22 is carried by the external casing 24. The primary air flow F1 enters the primary vein 18 through an annular air inlet 17 and escapes through a primary nozzle 19 which is arranged downstream of said primary vein 18.

The primary flow F1 can be accelerated by the primary nozzle 19 so as to generate a thrust reaction necessary for the flight of the aircraft.

The turbomachine comprises a rotating casing 26 centered on the longitudinal axis X and rotating around the latter. The rotating casing 26 carries a crown of movable blades 28 forming the propeller 14. The rotating casing 26 is mounted movable relative to the internal casing 12 which carries it.

The air flow F entering the turbomachine passes through the blades 28 of the propeller 14 to form the secondary air flow F2. The latter circulates around the external casing 24. Each blade 28 of the propeller 14 comprises a root 30 and an aerodynamic part extending radially outwards from the root 30, the latter comprising a pivot. Indeed, the root 30 is mounted pivoting about an axis A (perpendicular to X) thus allowing the blades 28 of the propeller 14 to pivot. This pivoting is managed by a first variable-pitch system of the turbomachine 2.

The low-pressure compressor 4 and the low-pressure turbine 10 are mechanically connected by a low pressure shaft 11, the latter drives the propeller 14 via a reducer 32, the propeller 14 compresses the air outside the external casing 24 and provides most of the thrust of the turbomachine 2. The reducer 32 may be of the planetary gear type. The turbomachine 2 comprises a rectifier 34 crossed by the secondary flow F2, the latter being a part of the air flow F propelled radially outwardly to the longitudinal axis X. The rectifier 34 comprises a plurality of stator blades 36 (or stator vanes or fixed vanes) known by the English acronym "OGV" (Outlet Guide Vane). The stator vanes 36 are distributed regularly around the longitudinal axis X and extend radially in the secondary air flow F2. The stator blades 36 are carried by a fixed structure secured to the external casing 24. In particular, each stator blade 36 extends radially from a foot 38, the latter is pivotally mounted about an axis B (perpendicular to X) allowing the stator blades 36 of the rectifier 34 to pivot. This pivoting is managed by a second variable-pitch system of the turbomachine 2.

The turbomachine 2 further comprises an oil tank 40 for the lubrication and/or cooling of the components of said turbomachine 2. For this purpose, the oil tank 40 is the main oil tank of the turbomachine 2, and also makes it possible to supply oil to the first and second variable pitch systems of the turbomachine 2. Preferably, the tank 40 is arranged in line with the external casing 24. The architecture and operation of the oil tank 40 will be detailed later in this description.

FIG. 2 is a diagram of the various closed circuits connected to the oil tank of the invention.

With reference to FIG. 2, the oil tank 40 is hydraulically connected to a lubrication and cooling circuit 42 of the turbomachine engine, this being a first closed circuit 42 of the turbomachine. This circuit comprises a feed pump 43, heat exchangers 44 and lubrication chambers 45, the latter ensuring the lubrication of the bearings, reducers and bearings and ensuring the air/oil seal of the engine.

The circuit 42 further comprises at least one recovery pump 46 configured to recover the oil from the lubrication chambers 45 and direct them to the oil tank 40. The first closed circuit 42 may correspond to a lubrication group of the turbomachine.

The oil tank 40 is also hydraulically connected to a circuit 48 for actuating the pitch of the propeller blades. For this purpose, the circuit 48 makes it possible to supply oil to the first variable-pitch system of the propeller 14 of FIG. 1; this is a second closed circuit 48 of the turbomachine.

The step actuation circuit 48 may also supply oil to the second variable pitch system of the rectifier 34 of FIG. 1, independently or in combination with the first variable pitch system.

The step actuation circuit 48 may provide lubrication and/or cooling functions for the variable pitch system. In this regard, the circuit 48 includes a booster pump 49 recovering oil from a lower portion of the tank 40 to direct it to a heat exchanger 50.

Preferably, the pitch actuation circuit 48 is also configured to hydraulically control the variable pitch system in addition to the lubrication and cooling functions. In this regard, the circuit 48 comprises a pitch actuation pump 51 capable of hydraulically controlling a pitch actuation system 52, the latter may correspond to the first and/or second variable pitch system of the turbomachine.

In this configuration, the actuating pump of step 51 makes it possible to actuate a hydraulic actuator causing the pivoting of feet 30 and 38 of FIG. 1.

Preferably, the pitch actuation circuit 48 comprises a by-pass valve 53 allowing the choice between a cooling function or actuation of the pitch of the variable pitch system.

Advantageously, there is a connection 71 between the hydraulic control circuit 48 and the lubrication circuit 42 to collect any leaks from the propeller pitch actuation cylinders and to reinject this oil into the tank 40 from an inlet 66.

The circuit 48 may include an oil return (shown in dotted lines) to the tank or said oil return may be directly connected upstream of the feed pump 49.

FIG. 3 shows a sectional view of the oil tank 40 comprising an enclosure for the oil 54 (oil not shown here to better simplify the illustration), having a main axis R preferably corresponding to a main direction R intended to be oriented vertically in the mounting position in the turbomachine 2 of FIG. 1.

The enclosure 54 formed by the walls 54.1, 54.2, 54.3 and 54.4 delimiting a first compartment 56 and a second compartment 58 separated from the first compartment 56 by a separation wall 60, the latter comprises a channel 62 extending into the first compartment 56 and precisely into a conduit 64 forming an oil outlet from the first compartment.

Preferably, the main axis R corresponds to the main direction of the extent of the enclosure 54. For this purpose, the main axis R defines the direction of the largest dimension of said enclosure 54.

Preferably, the main axis R of the enclosure 54 follows the direction of gravity (perpendicular to the horizontal plane). However, the main axis R may be inclined relative to the direction of gravity by an angle of up to 45° or exceed 45° to form an angle of less than 90°.

According to the direction of gravity (force perpendicular to the horizontal and directed downwards), the second compartment 58 is above the first compartment 56. In this configuration, the first compartment 56 is a lower compartment 56, and the second compartment 58 is an upper compartment 58.

Alternatively, the enclosure 54 of the tank 40 may have a substantially oblong and/or curved shape. Preferably, the enclosure 54 comprises a substantially cylindrical shape.

The enclosure 54 may include a perforated baffle (not shown) arranged above the partition wall 60 and allowing the oil to be filtered and purified before the oil reaches the lower compartment 56.

In this configuration, the conduit 64 extends from a bottom 54.3 of the enclosure 54 and opens into the lower compartment 56.

Preferably, the channel 62 is in a central position relative to the separation wall 60, and the conduit 64 is in a central position relative to the bottom 54.3.

The partition wall 60 is preferably inclined relative to a perpendicular to the main direction R by an angle of inclination a of between 10° and 60°, more preferably of between 30° and 50°, and even more preferably, the angle of inclination a is equal to 45°. For this purpose, the partition wall 60 is funnel-shaped.

Advantageously, the inclination of the separation wall 60 makes it possible to better guide the oil towards the channel 62.

Preferably, the conduit 64 comprises a distal portion 64.1 parallel to the separation wall 60 and also forming a funnel corresponding to the funnel shape of the separation wall 60, but the distal portion 64.1 may be inclined relative to said separation wall 60 by an angle of less than 20°.

The distal portion 64.1 of the conduit 64 has more than 20% of a total extent of said conduit 64, and less than 70% of said total extent. Preferably, the distal portion 64.1 extends over at least 40% of the total extent of said conduit 64.

The conduit 64 comprises a proximal portion 64.2 being substantially parallel to the main direction R. For this purpose, the channel 62 is coaxial with the conduit 64.

The channel 62 comprises a distal end 62.1 which may comprise a valve or a non-return valve 62.2 sensitive to changes in gravity. Indeed, in the event of a flight phase of the aircraft in positive gravity (G positive), the non-return valve 62.2 is capable of allowing the passage of the oil leaving the channel 62, but in the event of a flight phase of the aircraft in zero or negative gravity (GO or G negative), the valve 62.2 does not allow any passage of oil.

Similarly, the partition wall 60 may comprise at least one valve and/or at least one flap 60.1 sensitive to changes in gravity, this flap 60.1 and/or the non-return valve 62.2 of the channel 62 may advantageously allow, respectively, to accelerate the return of the oil into the lower compartment 56 during a transient phase from the negative G to the positive G, and to limit the quantity of oil going to the upper compartment 58 during another transient phase from the positive G to the negative G.

Preferably, the separation wall 60 comprises at least one vent 60.2 capable of evacuating the air that may be included in the lower compartment 56 during the transitional phase from the negative G to the positive G. Advantageously, the at least one vent 60.2 is ideally placed (at the lateral end of the separation wall 60) so as to accelerate the return of the oil to the lower compartment 56.

Furthermore, the distal end 62.1 delimits a buffer volume V' inside the conduit 64 with its distal portion 64.1. The buffer volume V' being included between the lines illustrated in dotted lines; these lines are perpendicular to the main direction. It should be noted that the low dotted line (adjacent to the bottom 54.3) stops at the distal end 62.1 of the channel 62 because in negative gravity it is at this level that the oil stops and no longer passes through the channel 62 to reach the upper compartment 58.

The buffer volume V' is partly dependent on the difference between the sections of the channel 62 and the conduit 64. For this purpose, the larger the section of the conduit 64 relative to the channel 62, the larger the buffer volume V' will be.

In this regard, the conduit 64 preferably has a section corresponding to at least 1.2 times the section of the channel 62 and/or at most 3 times the section of said channel 62.

Advantageously, the funnel shape of the distal portion 64.1 of the conduit 64 which is parallel to the separation wall 60 allows the oil of the buffer volume V' to be guided homogeneously downwards, thus accelerating its exit from the lower compartment 56.

The distal end 62.1 of the channel 62 also delimits a second volume V2 with the distal part 64.1 of the conduit 64, this second volume V2 being in the lower compartment 56 and outside the conduit 64. The volume V2 corresponds to the volume of oil that can be entirely consumed during a negative G phase before the oil supplying the second closed circuit is exhausted.

The distal part 64.1 of the conduit 64 delimits with the separation wall 60 a first volume V1 inside the lower compartment 56.

In this configuration, it is preferable that the second volume V2 is larger than the first volume V1, in order to secure a maximum quantity of oil in the lower compartment 56 in order to supply the variable pitch systems of the turbomachine without interruption.

FIG. 4 shows a sectional view of the oil tank 40 of FIG. 3 during a flight phase of the aircraft in positive G. For this purpose, G+ will refer to positive gravity and G− to negative gravity.

It should be noted that the tank 40 is capable of ensuring a constant supply of pure oil during G-flight phases, and each of the G-phases lasts between a fraction of a second and 45 seconds. Advantageously, the tank 40 can be sized so as to ensure a constant supply of oil even beyond 45 seconds.

In this regard, the oil tank 40 comprises an oil inlet 66 mixed with air directed towards the upper compartment 58, and precisely towards an oil deaerator device 68, making it possible to evacuate the air 70 which can be mixed with the oil. The oil inlet preferably comes from the at least one recovery pump 46 of FIG. 2.

The tank 40 further comprises an upper oil outlet 72 forming with the oil inlet 66 and the upper compartment 58 the first closed circuit 42 of FIG. 2.

Preferably, the upper oil outlet 72 is close to the separation wall 60 so as to maintain the supply of said outlet 72 in all circumstances, in particular during a return to the G+ after a G− event.

The tank 40 also comprises an oil outlet 74 comprising the conduit 64. In this configuration, the oil contained in the upper compartment 58 passes directly to the second closed circuit 48 (a portion of which is partially illustrated). For this purpose, the feed pump 49 draws the oil continuously, the dotted arrows illustrate the movements of the oil.

FIG. 5 shows a sectional view of the oil tank 40 of FIG. 3 during a flight phase of the aircraft in negative G (G−). Here the buffer volume V' allows the feed pump 49 to directly suck the oil contained in said buffer volume V' as soon as the G+ to G− passes. This makes it possible to ensure a supply of the second closed circuit 48 without interruption.

If all the oil contained in the buffer volume V' is consumed, the supply can be ensured by the oil contained in the volume V2.

The distal end 62.1 is devoid in FIG. 5 of a non-return valve. Indeed, the arrangement of the latter is optional and advantageously makes it possible to minimize the return of oil to the upper compartment at the start of the G-event. The air is not able to reach the feed pump 49 because the suction of the oil is continuous. For this purpose, an air blocking zone is created at the distal end 62.1 during the G-phase.

Advantageously, the turbomachine of the invention is capable of ensuring continuous and secure operation of its variable pitch systems thanks to the main oil tank making it possible to ensure oil supply in order to supply such systems with pure oil without any presence of air and without interruption of supply during flight phases in zero or negative gravity.

The invention claimed is:

1. An oil tank for a turbomachine, comprising:
- an enclosure for oil, defining a main axis, and including walls delimiting a first compartment and a second compartment separated from the first compartment by a separation wall;
- a channel extending into the first compartment, from the separation wall;
- an inlet for the oil mixed with air, arranged on the second compartment;
- an oil outlet comprising a conduit extending and opening into the first compartment; wherein the channel extends inside the conduit, so as to ensure oil supply to the conduit and maintain an oil supply to the conduit during flight phases in zero or negative gravity.

2. The oil tank according to claim 1, wherein the separation wall is inclined relative to a perpendicular to the main axis, towards the channel so as to guide the oil towards said channel.

3. The oil tank according to claim 2, in which the separation wall has with a perpendicular to the main axis an angle of inclination of between 10° and 60°.

4. The oil tank according to claim 3, wherein the conduit comprises a distal portion parallel to the separation wall or inclined relative to said separation wall by less than 20°.

5. The oil tank according to claim 3, in which the separation wall has with a perpendicular to the main axis an angle of inclination of between 30° and 50°.

6. The oil tank according to claim 2, wherein the channel is in a central position of the separation wall and said separation wall is funnel-shaped.

7. The oil tank according to claim 6, wherein a distal portion of the conduit is funnel-shaped corresponding to the funnel shape of the separation wall (60).

8. The oil tank according to claim 1, in which the conduit comprises a proximal portion being substantially parallel to the main axis.

9. The oil tank according to claim 1, wherein a distal portion of the conduit has at least 40% of a total extent of said conduit.

10. The oil tank according to claim 1, in which the conduit has a section corresponding to at least 1.2 times a section of the channel.

11. The oil tank according to claim 1, wherein the channel comprises a distal end forming with a distal portion of the conduit a buffer volume inside said conduit, said distal end of the channel and the distal portion of the conduit form a second volume outside the conduit, and the distal portion of the conduit forms with the separation wall a first volume, said first volume being smaller than the second volume in the lower compartment.

12. The oil tank according to claim 1, wherein the separation wall and/or a distal end of the channel further comprises at least one valve and/or at least one non-return valve responsive to changes in gravity.

13. A turbomachine, comprising:
- an unducted propeller propelling an incoming air flow, said propeller comprising a variable pitch system for actuating a pitch of the blades of the propeller; and
- the oil tank according to claim 1, wherein the oil tank lubricates components of the turbomachine.

14. The turbomachine according to claim 12, wherein the oil inlet to the second compartment and an upper oil outlet form with the second compartment a first closed circuit intended for the lubrication and/or cooling of the components of the engine of the turbomachine.

15. The turbomachine according to claim 13, wherein the variable pitch system is a first variable pitch system, and said turbomachine further comprises a rectifier comprising a plurality of stator vanes extending from a fixed casing, said rectifier comprising a second variable pitch system, and in that the oil outlet is hydraulically connected to a second closed circuit comprising components of the first variable pitch system and/or of the second variable pitch system of the turbomachine.

* * * * *